(12) United States Patent
Vajravel

(10) Patent No.: US 10,719,273 B2
(45) Date of Patent: Jul. 21, 2020

(54) ENABLING SCSI COMMANDS THAT ARE NOT SUPPORTED BY A CLIENT TERMINAL

(71) Applicant: Wyse Technology L.L.C., Santa Clara, CA (US)

(72) Inventor: Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 328 days.

(21) Appl. No.: 15/413,619

(22) Filed: Jan. 24, 2017

(65) Prior Publication Data

US 2018/0210648 A1 Jul. 26, 2018

(51) Int. Cl.
*G06F 3/06* (2006.01)

(52) U.S. Cl.
CPC .......... *G06F 3/067* (2013.01); *G06F 3/0605* (2013.01); *G06F 3/0661* (2013.01)

(58) Field of Classification Search
CPC ......... G06F 11/1662; G06F 2213/0036; G06F 2212/152; G06F 2212/657; G06F 3/067; H04L 67/1097
See application file for complete search history.

(56) References Cited

U.S. PATENT DOCUMENTS

| | | | | |
|---|---|---|---|---|
| 5,548,783 A * | 8/1996 | Jones | .................... | G06F 3/0601 703/24 |
| 5,838,891 A * | 11/1998 | Mizuno | ................. | G06F 3/0601 714/5.11 |
| 6,954,881 B1 * | 10/2005 | Flynn, Jr. | .............. | G06F 3/0617 714/43 |
| 7,519,769 B1 * | 4/2009 | Kulkarni | ............... | G06F 3/0607 711/114 |
| 8,438,315 B1 * | 5/2013 | Tao | ........................ | G06F 9/4411 710/5 |
| 8,789,070 B2 * | 7/2014 | Barreto | ................. | G06F 9/4411 719/321 |
| 9,058,119 B1 * | 6/2015 | Ray, III | ................... | G06F 3/061 |
| 9,940,293 B1 * | 4/2018 | Desai | .................... | G06F 13/426 |
| 2004/0064594 A1 * | 4/2004 | Pooni | ..................... | G06F 13/423 710/1 |
| 2004/0199353 A1 * | 10/2004 | Bingham | ............ | G06F 11/2221 702/122 |
| 2006/0251087 A1 * | 11/2006 | Ng | ........................ | G06F 13/387 370/401 |

(Continued)

*Primary Examiner* — Jason D Recek
*Assistant Examiner* — Ranjan Pant
(74) *Attorney, Agent, or Firm* — Kirton McConkie; Brian Tucker

(57) ABSTRACT

SCSI commands that are not supported by a client terminal can be enabled. In scenarios where the client terminal's operating system may not support the same SCSI commands as the server's operating system, a redirected mass storage device that does support the same SCSI commands as the server's operating system can still be initialized on the server as supporting these SCSI commands. Then, to allow the SCSI commands that are not supported by the client terminal's operating system to be provided to the mass storage device, a client-side proxy can employ a SCSI Pass Through Interface to send the unsupported commands rather than providing them to the client-side disk driver. The proxy may still provide supported SCSI commands to the client-side disk driver for typical handling.

12 Claims, 14 Drawing Sheets

(56) References Cited

U.S. PATENT DOCUMENTS

| | | | | |
|---|---|---|---|---|
| 2007/0174534 A1* | 7/2007 | Wurzburg | G06F 13/385 |
| | | | 710/315 |
| 2008/0005297 A1* | 1/2008 | Kjos | G06F 12/1081 |
| | | | 709/223 |
| 2009/0055573 A1* | 2/2009 | Ito | G06F 3/0622 |
| | | | 711/102 |
| 2009/0150550 A1* | 6/2009 | Barreto | H04L 29/08846 |
| | | | 709/228 |
| 2009/0150909 A1* | 6/2009 | Barreto | G06F 9/4411 |
| | | | 719/324 |
| 2009/0182919 A1* | 7/2009 | Chang | G06F 13/4291 |
| | | | 710/106 |
| 2009/0193155 A1* | 7/2009 | Skillman | G06F 9/4411 |
| | | | 710/14 |
| 2011/0047195 A1* | 2/2011 | Le | G06F 16/13 |
| | | | 707/827 |
| 2012/0054746 A1* | 3/2012 | Vaghani | G06F 9/5022 |
| | | | 718/1 |
| 2014/0325141 A1* | 10/2014 | Liu | G06F 12/0246 |
| | | | 711/112 |
| 2016/0125205 A1* | 5/2016 | Vajravel | G06F 13/4095 |
| | | | 710/108 |
| 2017/0192851 A1* | 7/2017 | Per | G06F 16/11 |

\* cited by examiner

ENABLING SCSI COMMANDS THAT ARE NOT SUPPORTED BY A CLIENT TERMINAL

CROSS-REFERENCE TO RELATED APPLICATIONS

N/A

BACKGROUND

The present invention is generally directed to device redirection in a virtual desktop infrastructure (VDI) environment. Device redirection generally refers to making a device that is connected to a client terminal accessible within a virtual desktop as if the device had been physically connected to the virtual desktop. In other words, when device redirection is implemented, a user can connect a device to his or her client terminal and the device will function as if it had been connected to the server.

FIGS. 1 and 2 and the following description will provide a general overview of how device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client terminal 102 can remotely access applications and data at the server 104 from the client terminal 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client terminal 102 may initiate a remote session with server 104 by sending a request for remote access and credentials (e.g., login name and password) to server 104. If server 104 accepts the credentials from client terminal 102, then server 104 may establish a remote session, which allows a user at client terminal 102 to access applications and data at server 104. During the remote session, server 104 sends display data to client terminal 102 over network 106, which may include display data of a desktop and/or one or more applications running on server 104. The desktop may include, for example, icons corresponding to different applications that can be launched on server 104. The display data allows client terminal 102 to locally display the desktop and/or applications running on server 104.

During the remote session, client terminal 102 may send user commands (e.g., inputted via a mouse or keyboard at client terminal 102) to server 104 over network 106. Server 104 may process the user commands from client terminal 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client terminal 102. Client terminal 102 locally displays the updated display data so that the user at client terminal 102 can view changes at server 104 in response to the user commands. Together, these aspects allow the user at client terminal 102 to locally view and input commands to the desktop and/or application that is running remotely on server 104. From the perspective of the client side, the desktop running on server 104 may represent a virtual desktop environment.

Windows I/O uses a layered architecture where device drivers are on a device stack. In a basic model, the top of the stack is the file system. Next is the volume manager, followed by the disk driver. At the bottom of the device stack are the port and miniport drivers. When an I/O request reaches the file system, it takes the block number of the file and translates it to an offset in the volume. The volume manager then translates the volume offset to a block number on the disk and passes the request to the disk driver. When the request reaches the disk driver it will create a Command Descriptor Block (CDB) that will be sent to the SCSI device. The disk driver imbeds the CDB into a structure called the SCSI_REQUEST_BLOCK (SRB). This SRB is sent to the port driver as part of the I/O request packet (IRP).

The port driver does most of the request processing including providing timing services for requests, enforcing queue depth (making sure that a device does not get more requests that it can handle), and building scatter gather arrays for data buffers. The port driver interfaces with a driver called the miniport. The miniport driver is designed by the hardware manufacturer to work with a specific adapter and is responsible for taking requests from the port driver and sending them to the target logical unit number (LUN). The port driver calls the HwStorStartIo( ) function to send requests to the miniport, and the miniport will send the requests to the LUN. When the request is complete, the miniport will call StorPortNotification( ) with the NotificationType parameter value set to RequestComplete, along with a pointer to the completed SRB.

FIG. 2 is a block diagram of a virtual device infrastructure (VDI) environment 200 which can implement this type of functionality when a mass storage device is redirected from a client terminal 102 to a server 104 over a remote session. As shown, while client terminal 102 has established a remote session with server 104, a mass storage device 240 is connected to client terminal 102. In accordance with embodiments of the present invention, client terminal 102 can be configured to redirect device 240 over the remote session so that the device is accessible on server 104. Proxy 210 on client terminal 102 and agent 250 on server 104 can be configured to establish and maintain the remote session to enable this redirection.

FIG. 2 provides a general overview of the primary components that can be employed to redirect mass storage device 240 at the disk level. This technique can be referred to as disk level redirection and is distinguished from general USB redirection in that the redirection occurs at the disk level rather than at the USB device level. In particular, client terminal 102 can include a disk driver stack 220 that includes a disk driver 220a, a USB storage driver 220b, and a USB hub driver 220c. As is known in the art, USB storage driver 220b and USB hub driver 220c can implement the USB protocol to enable communication with device 240 as a USB mass storage device. Disk driver 220a, which in some embodiments may be an instance of the disk.sys process, can function to service read/write requests and to abstract the underlying USB storage and hub drivers 220b, 220c.

When mass storage device 240 is connected to client terminal 102, disk driver 220a may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, disk driver 220 redirects device 240 to server 104 via proxy 210.

Agent 250 may be configured to receive the report from proxy 210 that device 240 is connected to client terminal 102 and the device information. Agent 250 may further be configured to associate with the report from proxy 210 one or more identifiers for client terminal 102 and/or for a user session through which client terminal 102 is connected to server 104, such as a session number or a session locally unique identifier (LUID). Agent 250 can provide notification of device 240, along with the device information, to virtual disk enumerator 260. Virtual disk enumerator 260 may be configured to create and store in memory a record corresponding to device 240, the record including at least part of the device information and session identifiers received from agent 250. Virtual disk enumerator 260 may be configured to report to operating system 170 of server 104 that device 240 is connected and to provide the device information to the operating system. This allows the operating system of server 104 to recognize the presence of device 240 even though device 240 is connected to client terminal 102.

Based on the device information, operating system 170 may load a corresponding disk driver 282, which may be another instance of the disk.sys process, which may sit below a file system stack 280 to receive and convert file system requests to disk requests (e.g., by creating a CDB and embedding it in an SRB) and to pass these disk requests (e.g., IRPs and associated SRBs) to virtual disk enumerator 260 at the bottom of the device stack. It is noted that a volume manager is not shown in this figure for simplicity. Virtual disk enumerator 260 functions to virtualize mass storage device 240 on server 104 (as represented by virtual mass storage device 290). This virtualization is accomplished by routing the disk requests to agent 250 which will forward them over the remote session to proxy 210, down through disk driver stack 220, and to mass storage device 240 where they can be fulfilled. Corresponding responses can then be routed in a reverse direction towards virtual disk enumerator 260 and up through disk driver 282, file system stack 280, operating system 170, and ultimately to an application 270 that originated the request.

It is to be understood that an IRP itself is not transferred between proxy 210 and agent 250 (since much of the IRP is server-specific (e.g., pointers) and would therefore be meaningless on the client). Instead, sufficient content of the IRP is transferred from agent 250 to proxy 210 to allow proxy 210 to recreate (or to cause to be recreated) an equivalent IRP on the client side. A similar process is employed when proxy 210 returns results of handling an IRP. However, to simplify the description, this specification may refer to an IRP being sent by agent 250 to proxy 210. Also, in this specification, a SCSI command may be referred to as being sent to proxy 210. It is to be understood that a SCSI command would be sent to proxy 210 as part of the content of the IRP.

Oftentimes an older and/or simplified operating system may be employed on client terminal 102. In such cases, client terminal 102's operating system may not support all of the disk level commands that server 104's operating system supports. In a current example, server 104 may run Windows 8.1, Windows Server 2012 R2, or a later version that supports SCSI specification SPC-4 while client terminal 102 may run Windows Embedded 8 Standard, Windows 8, an earlier Windows version, or another operating system that only supports SCSI specification SPC-3 or lower. Also, many newer mass storage devices support SCSI specification SPC-4.

In scenarios where disk level redirection is implemented between a server and a client terminal having an operating system that does not support the same capabilities as the server's operating system, various issues arise due to the fact that file system stack 280 is implemented on server 104 while disk driver stack 220 is implemented on client terminal 102. For example, SCSI specification SPC-4 defines UNMAP/TRIM commands that allow the operating system to inform the storage device of which blocks of data are no longer considered in use and can therefore be wiped internally. These commands are especially important for flash-based disk devices and SSDs because they allow them to perform garbage collection efficiently.

If client terminal 102's operating system does not support SCSI specification SPC-4, the VDI may be configured to initialize mass storage device 290 on server 104 to use an older SCSI protocol version (e.g., SCSI specification SPC-3) even if mass storage device 240 and server 104's operating system support SCSI specification SPC-4. This is because disk driver stack 220 and particularly disk driver 220a (which will be limited by client 102's operating system) would not be able to support all of the commands of SCSI specification SPC-4. Alternatively, if mass storage device 290 is initialized to use the latest SCSI protocol version, operating system 170 will be able to send unsupported commands towards mass storage device 240 but disk driver 220a will reject these commands as unsupported. As a result, even though mass storage device 240 may be capable of handling the UNMAP/TRIM commands (or any other SCSI commands that are not supported by the client terminal's operating system), operating system 170 will not be able to send these commands to mass storage device 240. The end result is that mass storage device 240 will be unable to efficiently perform garbage collection leading to lower IOPs, higher write amplification, and a shortened disk life. In short, the client terminal's operating system oftentimes limits the performance of a redirected mass storage device.

BRIEF SUMMARY

The present invention extends to methods, systems, and computer program products for enabling SCSI commands that are not supported by a client terminal. In scenarios where the client terminal's operating system may not support the same SCSI commands as the server's operating system, a redirected mass storage device that does support the same SCSI commands as the server's operating system can still be initialized on the server as supporting these SCSI commands. Then, to allow the SCSI commands that are not supported by the client terminal's operating system to be provided to the mass storage device, a client-side proxy can employ a SCSI Pass Through Interface (SPTI) to send the unsupported commands rather than providing them to the client-side disk driver. The proxy may still provide supported SCSI commands to the client-side disk driver for typical handling.

In one embodiment, the present invention is implemented by a proxy executing on a client terminal in a virtual desktop infrastructure environment as a method for enabling SCSI commands that are not supported by a client terminal. The proxy receives information defining a first SCSI command that originated on a server and that targets a mass storage device that is connected to the client terminal and redirected to the server. The proxy determines whether the first SCSI command is supported on the client terminal. When it is determined that the first SCSI command is not supported on the client terminal, the proxy employs a SCSI Pass Through Interface to provide the first SCSI command to the mass storage device.

In another embodiment, the present invention is implemented as computer storage media storing computer executable instructions which when executed by one or more processors implement a virtual desktop infrastructure that includes a proxy. The proxy is configured to: receive information defining SCSI commands that target a redirected mass storage device; determine whether each SCSI command is supported by a client terminal on which the proxy executes; and selectively route each SCSI command to the mass storage device based on whether the SCSI command is supported by the client terminal.

In another embodiment, the present invention is implemented by a proxy executing on a client terminal in a virtual desktop infrastructure environment as a method for enabling SCSI commands that are not supported by a client terminal. In response to a mass storage device being connected to the client terminal, the proxy queries the mass storage device for a highest version of the SCSI protocol that the mass storage device supports. The proxy reports the connection of the mass storage device to an agent on a server, including providing the highest version of the SCSI protocol that the mass storage device supports to the agent. The proxy then receives, from the agent, information defining a SCSI command that targets the mass storage device. The proxy determines that an operating system of the client terminal does not support the SCSI command, and, in response, employs a SCSI Pass Through Interface to provide the SCSI command to the mass storage device rather than passing the SCSI command to a disk driver on the client terminal.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented as part of a virtual desktop infrastructure (VDI) environment to enable disk level commands, which would not otherwise be supported by the client terminal's operating system, to be sent to a redirected mass storage device. A remote session can be established using any remoting protocol including, for example, Microsoft's Remote Desktop Protocol (RDP), Citrix's Independent Computing Architecture (ICA), VMWare's PC-over-IP (PCoIP), Dell's vWorkspace (EOP), etc.

Figure 1:
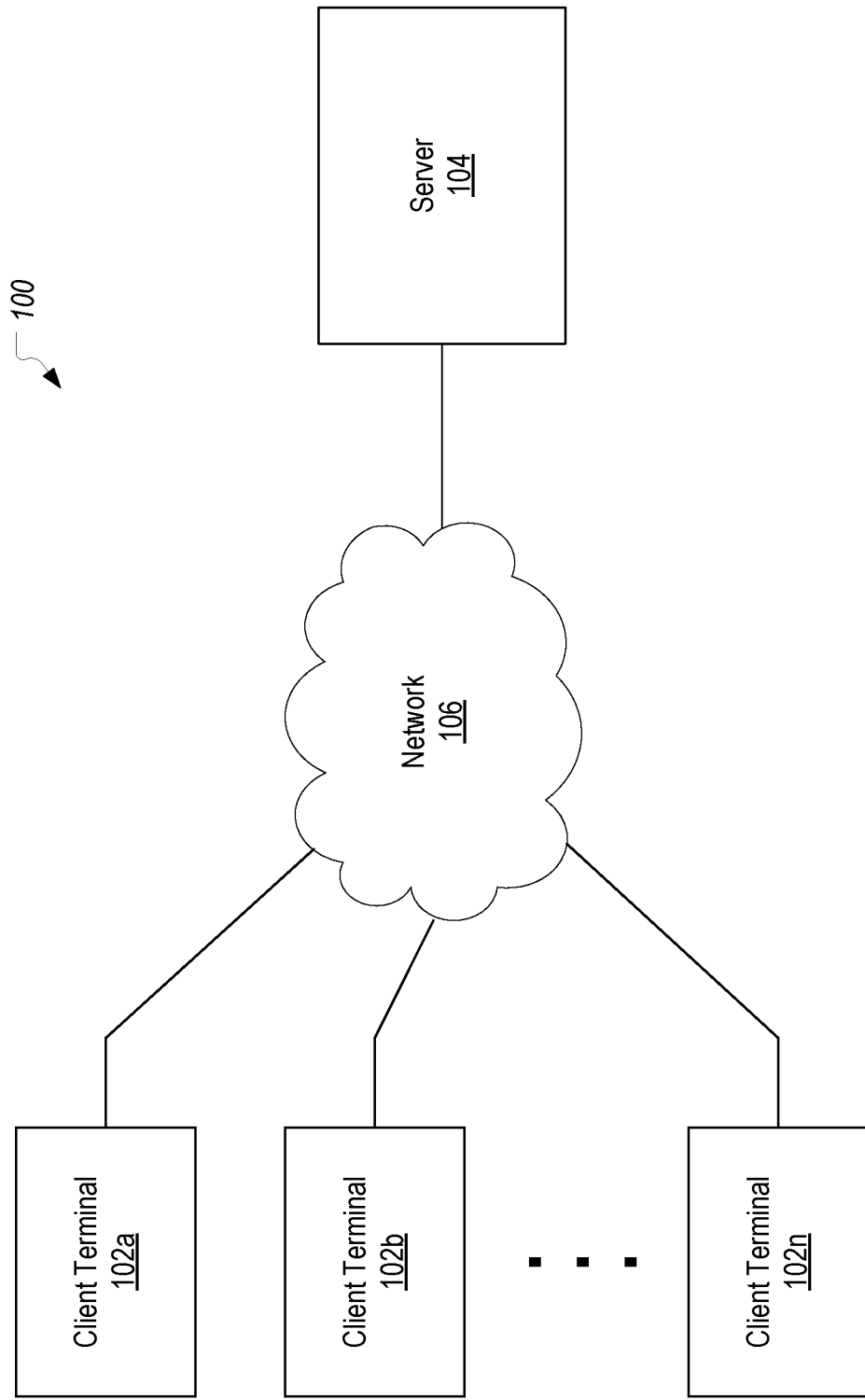
FIG. 1 illustrates an example computing environment in which the present invention can be implemented.
Figure 2:
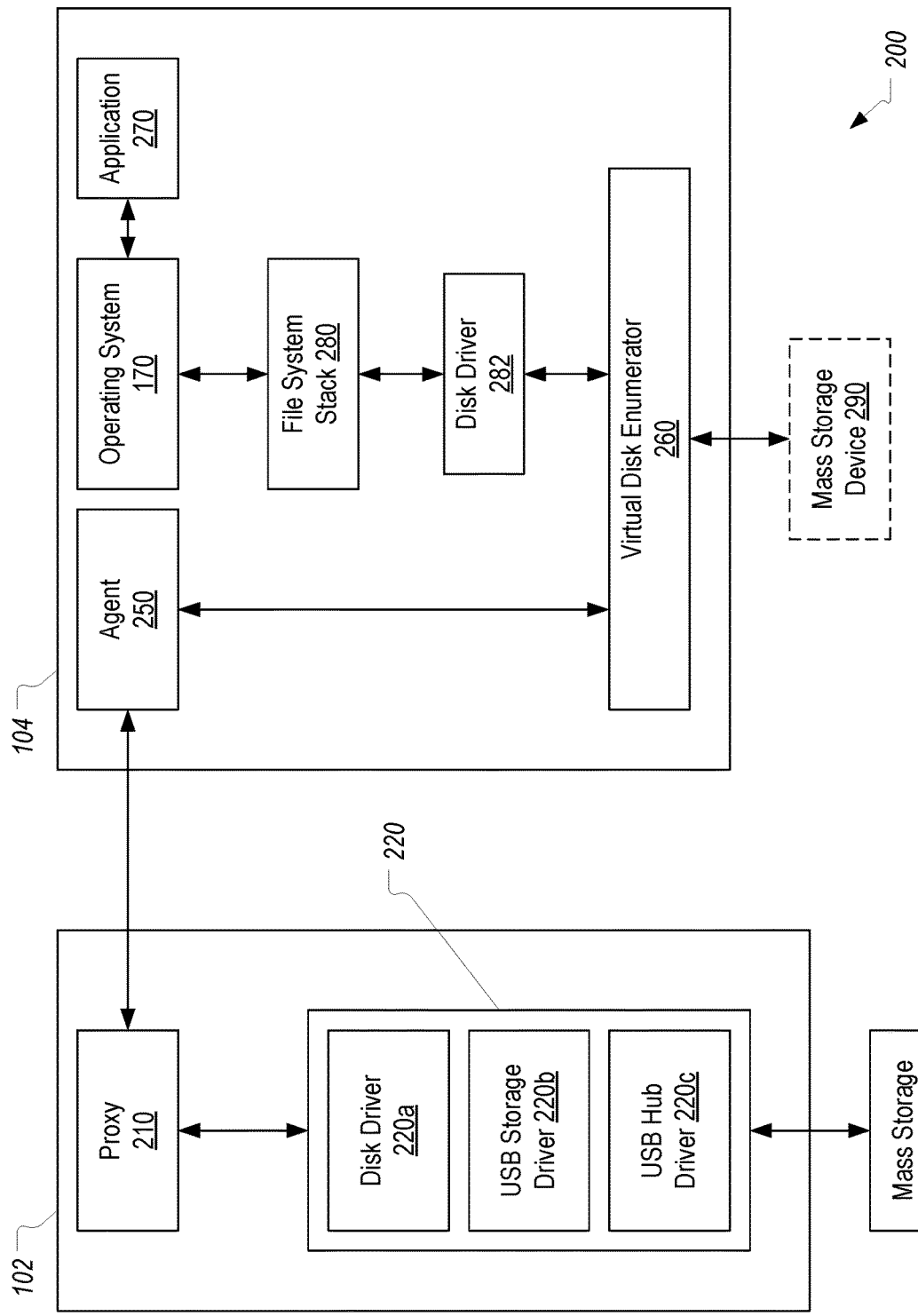
FIG. 2 illustrates how a mass storage device connected to a client can be redirected over a remote session to the server.
Figure 3:
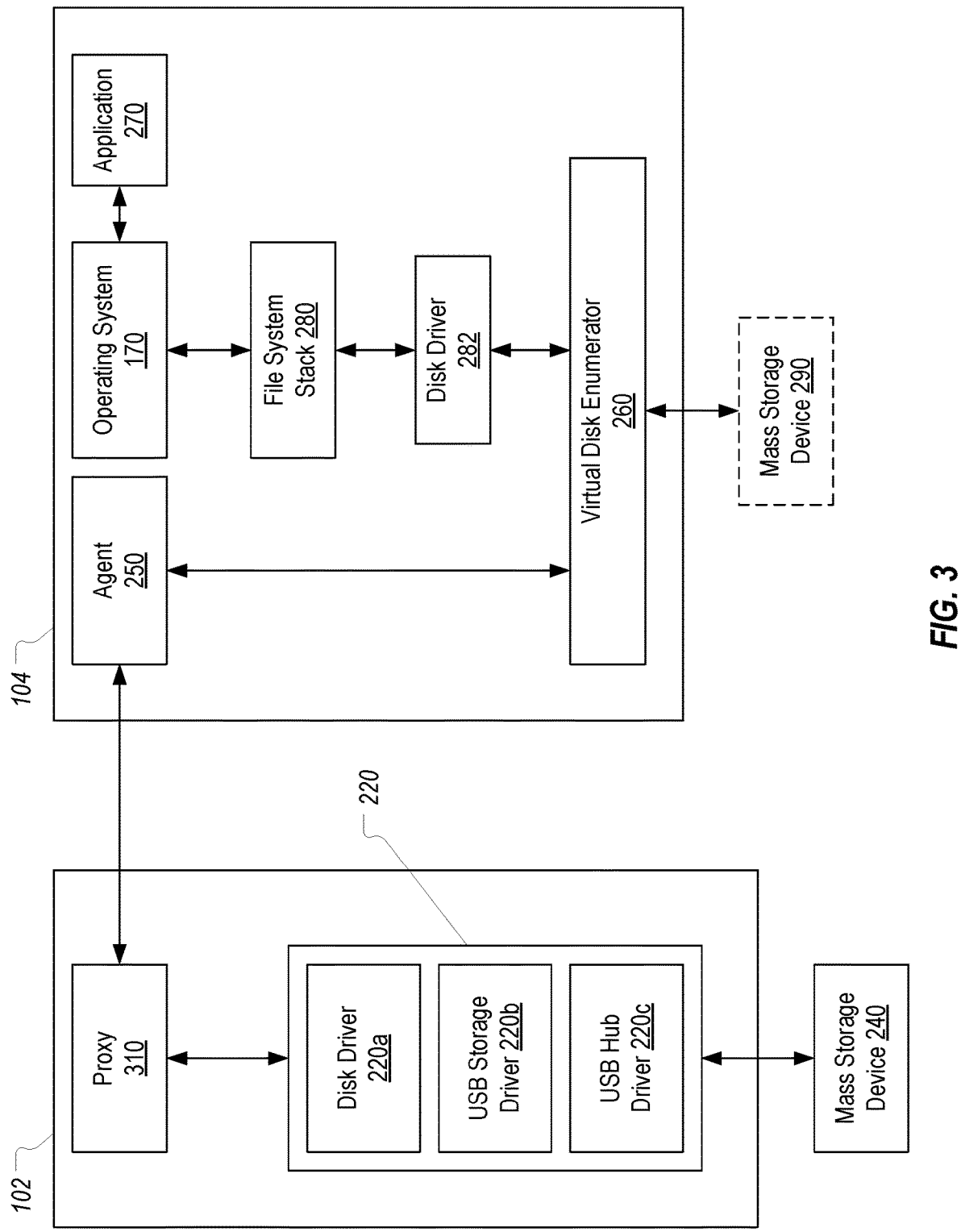
FIG. 3 illustrates a VDI environment in which the present invention can be implemented.

FIG. 3 illustrates an example redirection environment in which the present invention can be implemented. FIG. 3 is the same as FIG. 2 except that proxy 310 has replaced proxy 210. Accordingly, the present invention can be implemented within a client-side proxy with few or no additional changes to the VDI environment.

In FIG. 3 as well as the following description, it will be assumed that the operating system of client terminal 102 does not support the same SCSI commands as the operating system of server 104. It will also be assumed that mass storage device 240 supports the same SCSI commands as the operating system of server 104 (or at least supports commands that the operating system of client terminal 102 does not support). Using a current example, the operating system of server 104 and mass storage device 240 may support SCSI specification SPC-4 while the operating system of client terminal 102 may support SCSI specification SPC-3 or a lower version. It is to be understood, however, that the present invention is not limited to any particular SCSI specification versions. Instead, the present invention could be implemented whenever the operating system of client terminal 102 does not support commands that the operating system of server 104 supports.

By way of overview, in typical redirection scenarios, virtual disk enumerator 260 is configured to cause operating system 170 to load a version of a disk driver that is consistent with disk driver 220a. In other words, virtual disk enumerator 260 will cause virtual mass storage device 290 to be initialized as compliant with whatever version of the SCSI protocol that disk driver 220a supports. This will ensure that unsupported commands are not sent to mass storage device 290. In contrast, the present invention provides a technique to ensure that disk driver 282, which is assumed to be compliant with a higher version of the SCSI protocol than disk driver 220a, will be loaded. This will ensure that operating system 170 can send all commands available in the higher version of the SCSI protocol.

Figure 4A:
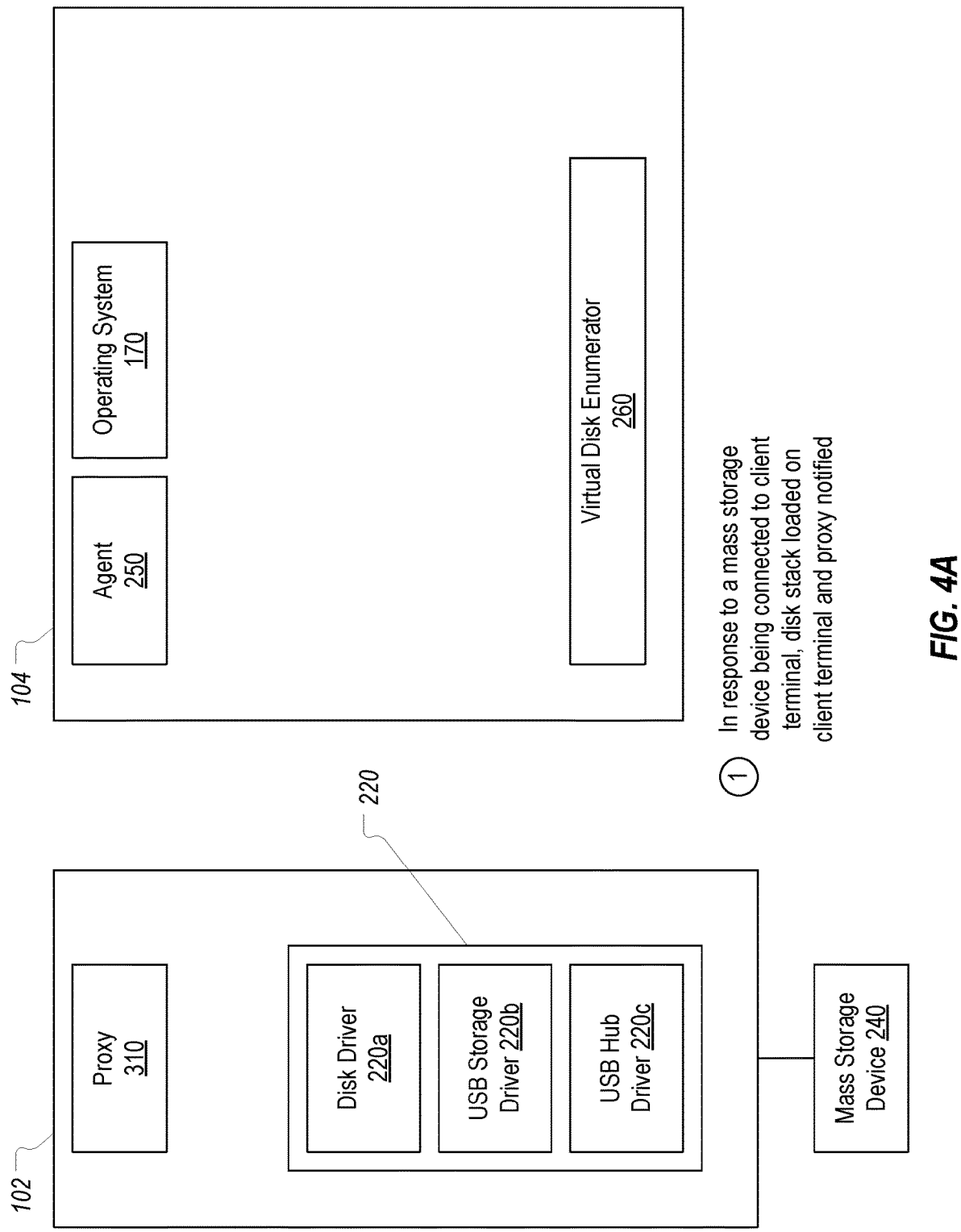
FIGS. 4A-4E illustrate how a redirected mass storage device can be initialized on the server as complying with a higher version of the SCSI protocol that is supported by the client-side operating system.

FIGS. 4A-4E illustrate a sequence of steps that can be performed to ensure that mass storage device 290 will be initialized as compliant with the highest version of the SCSI protocol supported by mass storage device 240 rather than as compliant with the version of the SCSI protocol supported by the operating system of client terminal 102. In step 1 as shown in FIG. 4A, it is assumed that mass storage device 240 has been connected to client terminal 102 while client terminal 102 has established a remote session on server 104. As a result, disk stack 220 will be loaded on client terminal 102.

Figure 4B:
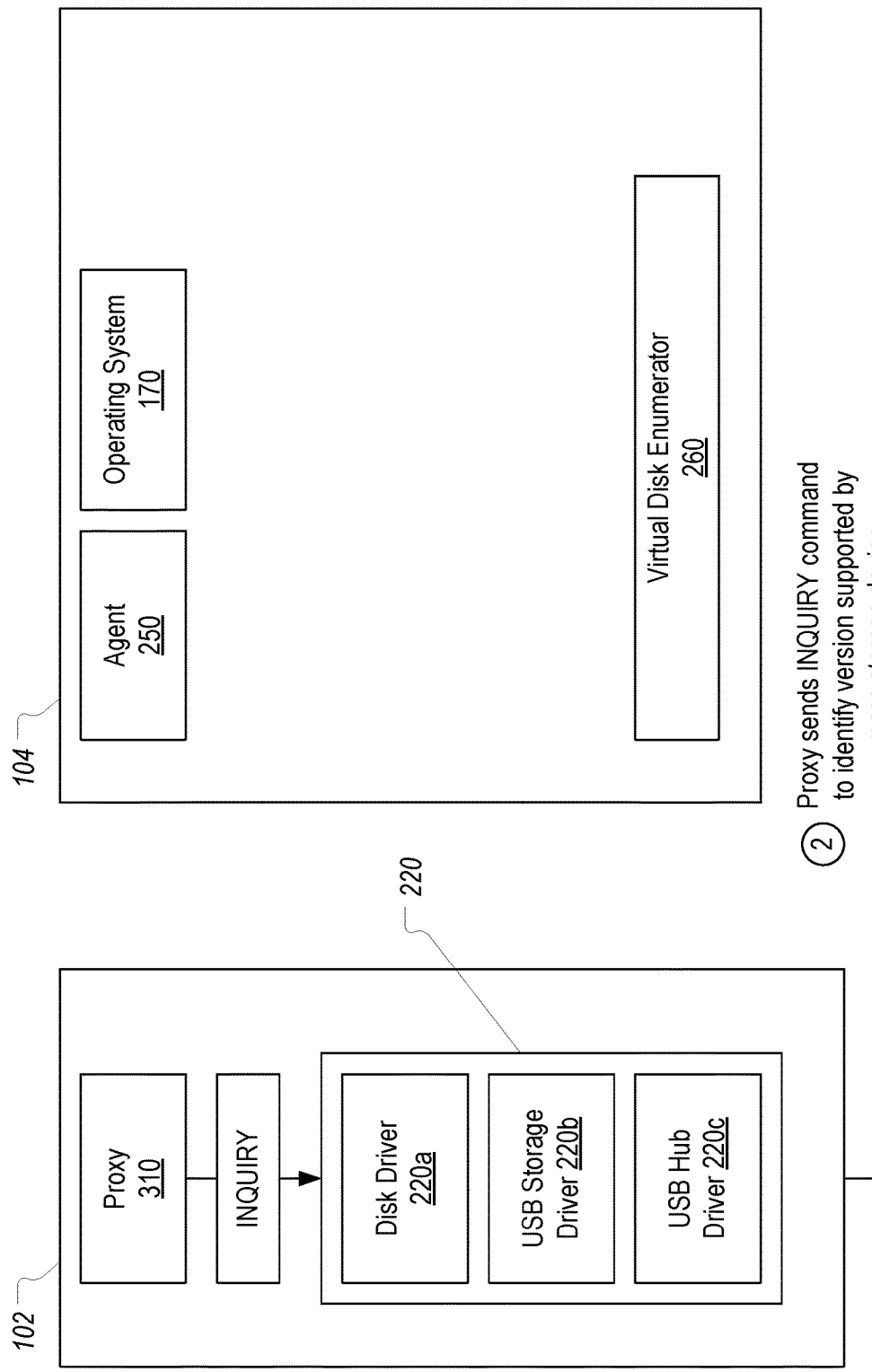
Figure 4C:
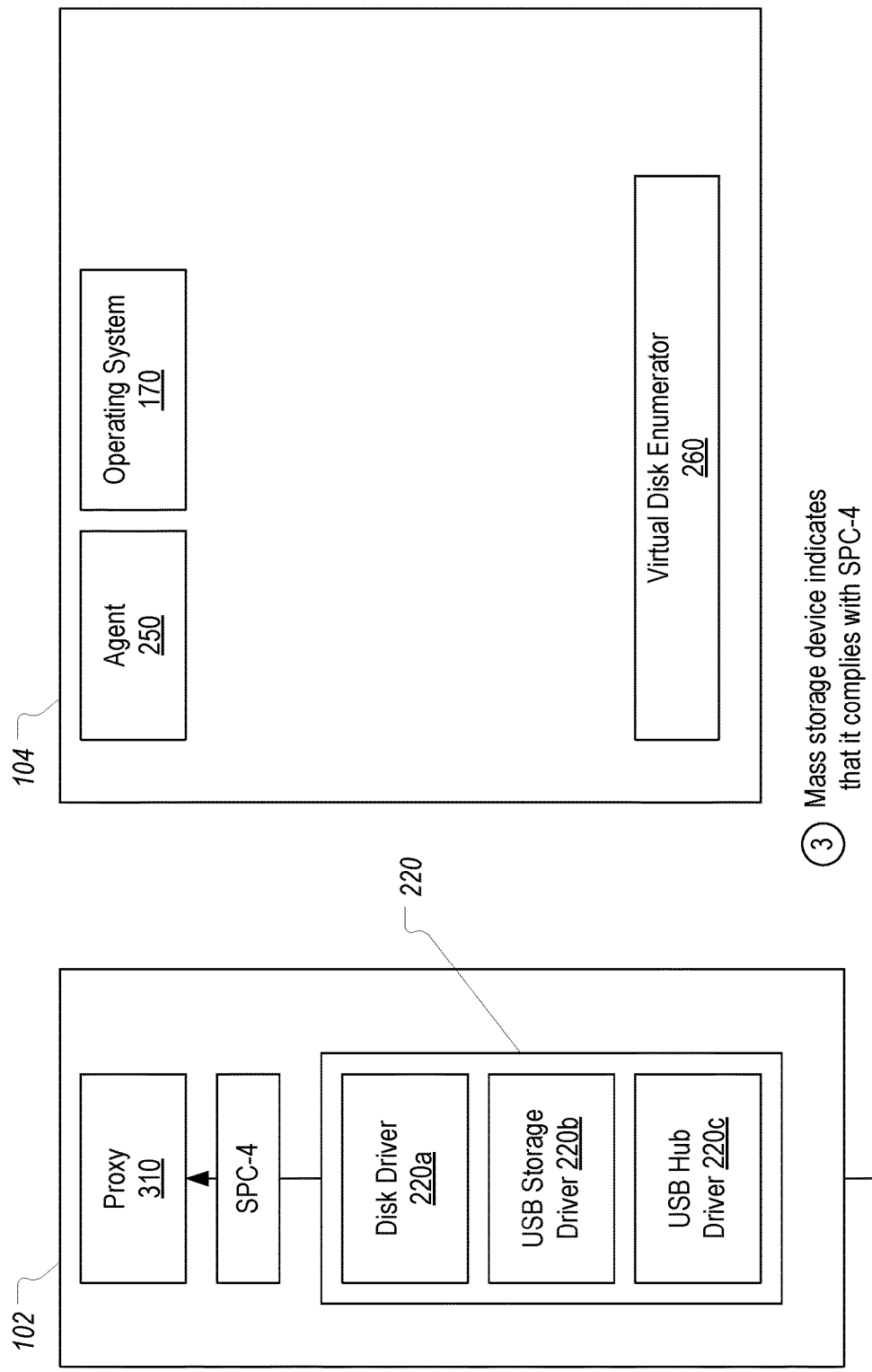

Next, in step 2 shown in FIG. 4B, proxy 310 can send an INQUIRY command to mass storage device 240 which requests the version(s) of the SCSI protocol with which mass storage device 240 complies. In step 3 shown in FIG. 4C, it is assumed that mass storage device 240 complies with SPC-4 and therefore mass storage device 240 will provide a response to the INQUIRY command that identifies SPC-4 (e.g. by including 06h in the version field of the response).

Figure 4D:
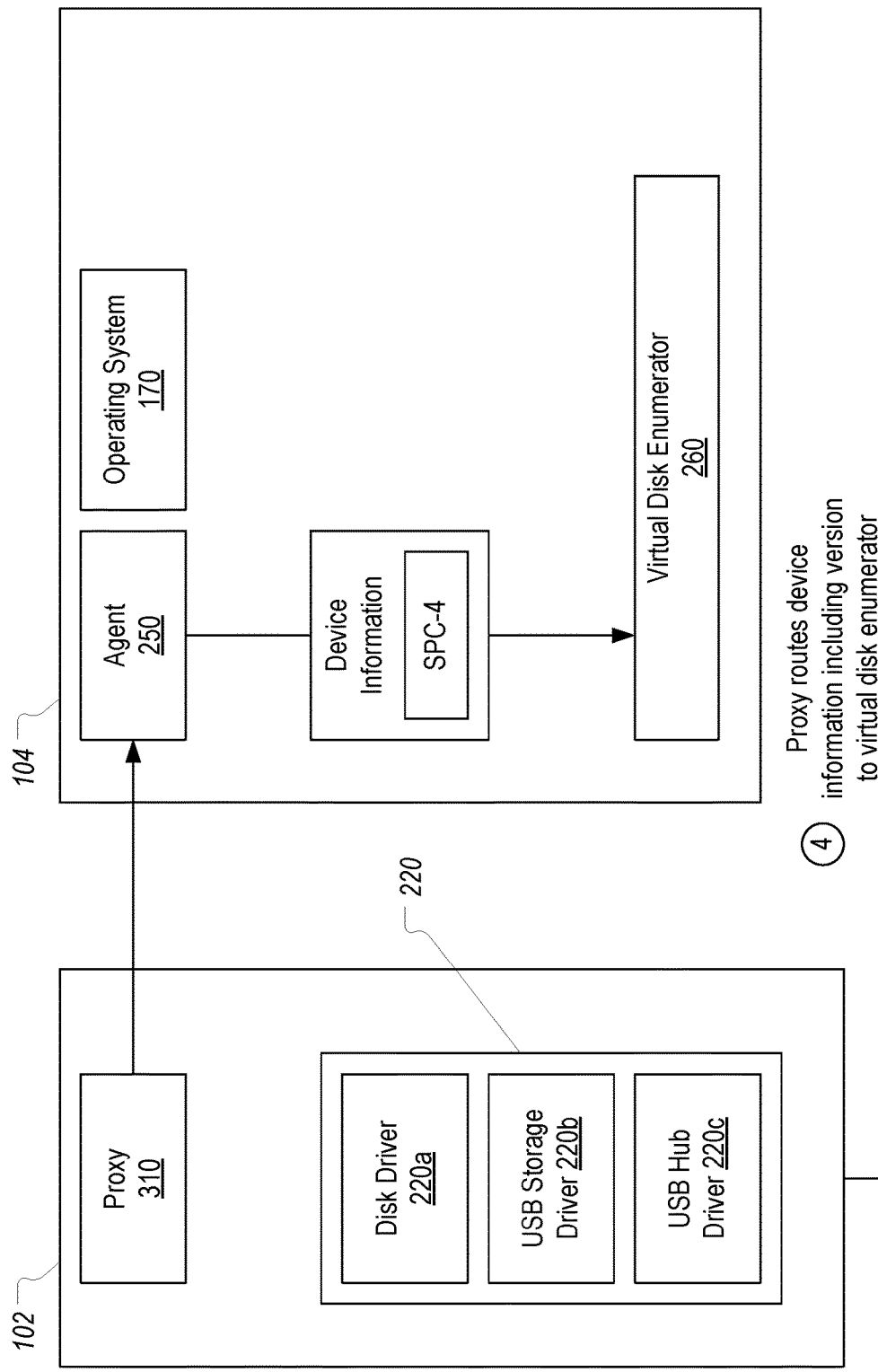

In step 4 as shown in FIG. 4D, proxy 310 will notify agent 250 about the connection of mass storage device 240 including providing sufficient information about mass storage device 240 to allow virtual disk enumerator 260 to cause the appropriate drivers to be loaded on server 104. Importantly, proxy 310 can include the version of the SCSI protocol that mass storage device 240 supports in this device information. Agent 250 will then provide this device information to virtual disk enumerator 260. Finally, in step 5 shown in FIG. 4E, virtual disk enumerator 260 will invoke the plug and play functionality of operating system 170 to cause file system stack 280 and disk driver 282 to be loaded thereby causing virtual mass storage device 290 to appear as being accessible on server 104. Importantly, in response to the version specified in the device information, virtual disk enumerator 260 will cause disk driver 282, which supports SPC-4 rather than SPC-3, to be loaded. In other words, virtual disk enumerator 260 will initialize mass storage device 290 on server 104 as compliant with SPC-4 even though disk driver 220a on client terminal 102 does not support SPC-4.

Figure 4E:
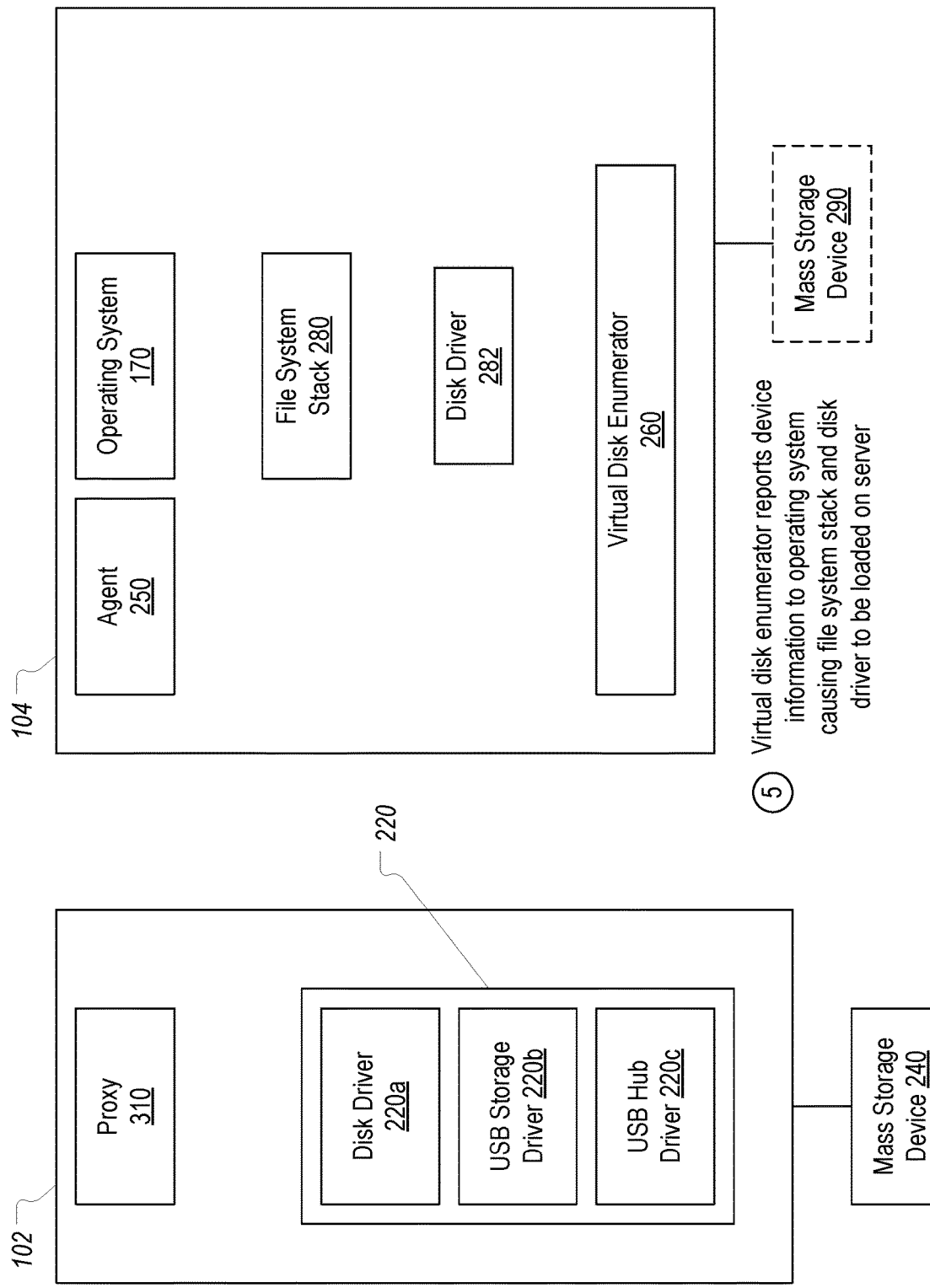

In the state depicted in FIG. 4E, operating system 170 will be able to send any command supported in SPC-4 to mass storage device 240/290 even though the command may not be supported on client terminal 102. For example, when a file on mass storage device 240 is deleted, operating system 170 can send the UNMAP and/or TRIM commands towards mass storage device 240. The fact that disk driver 220a does not support these commands is hidden from operating system 170. The same would be true of any other SCSI command that may be supported by operating system 170 but not by the operating system on client terminal 102.

As with any other command bound for mass storage device 240, virtual disk enumerator 260 can route the "unsupported" commands (or, more specifically, sufficient information to allow a corresponding IRP to implement the command to be created on client terminal 102) to proxy 310 via agent 250. However, at this point, proxy 310 will not be able to pass the unsupported commands onto disk driver 220a (or, if it did, disk driver 220a would reject the commands). To address this issue, proxy 310 can be configured to selectively route unsupported commands directly to mass storage device 240 rather than passing them onto disk driver 220a.

Figure 5A:
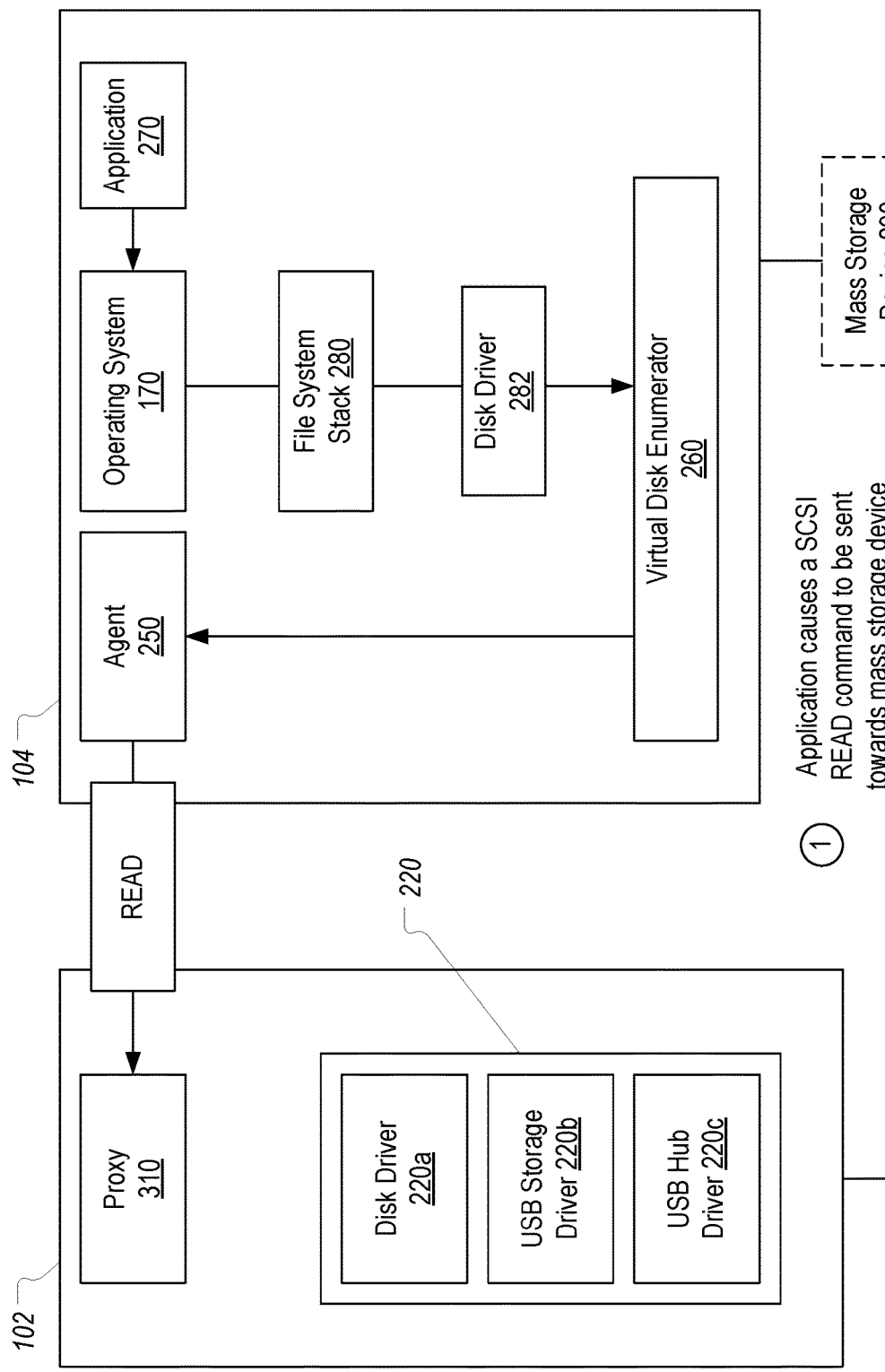
FIGS. 5A-5E illustrate how a client-side proxy can selectively route SCSI commands based on whether the SCSI commands are supported by the client-side disk driver.
Figure 5B:
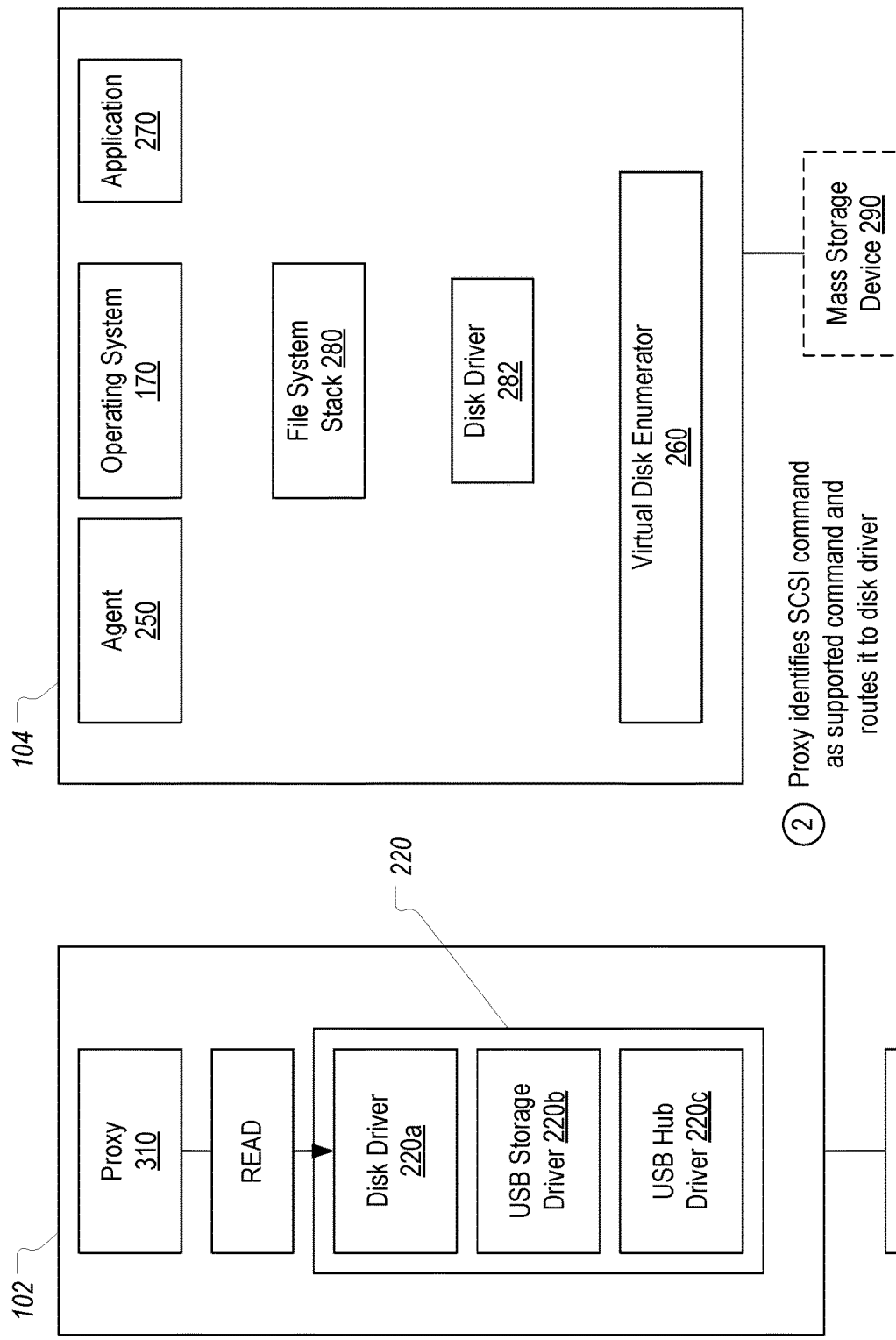

FIGS. 5A-5E illustrate how proxy 310 can selectively route SCSI commands based on whether the SCSI command is supported by disk driver 220a. In FIG. 5A, proxy 310 is shown as receiving a SCSI READ command in step 1 as a result of application 270 attempting to access data stored on mass storage device 240. As explained in the background, this READ command would be defined in a CDB that is embedded in a SRB which accompanies an IRP. As mentioned above, virtual disk enumerator 260 and/or agent 250 could extract sufficient information from the server-side IRP to allow an equivalent client-side IRP to be created.

In response to receiving the READ command (or the information defining the READ command), proxy 310 can analyze the command and determine whether it is supported by disk driver 220a. In the present example, a READ command would be supported by SPC-3, and therefore disk driver 220a will be able to handle the command. Accordingly, proxy 310 can pass the READ command to disk driver 220a (or more appropriately, can invoke the appropriate API calls (e.g., DeviceIoControl) to cause disk driver 220a to generate an appropriate IRP that includes the READ command). Disk driver 220a will handle the command in a typical fashion including by validating the command and then passing the IRP down disk stack 220.

Figure 5C:
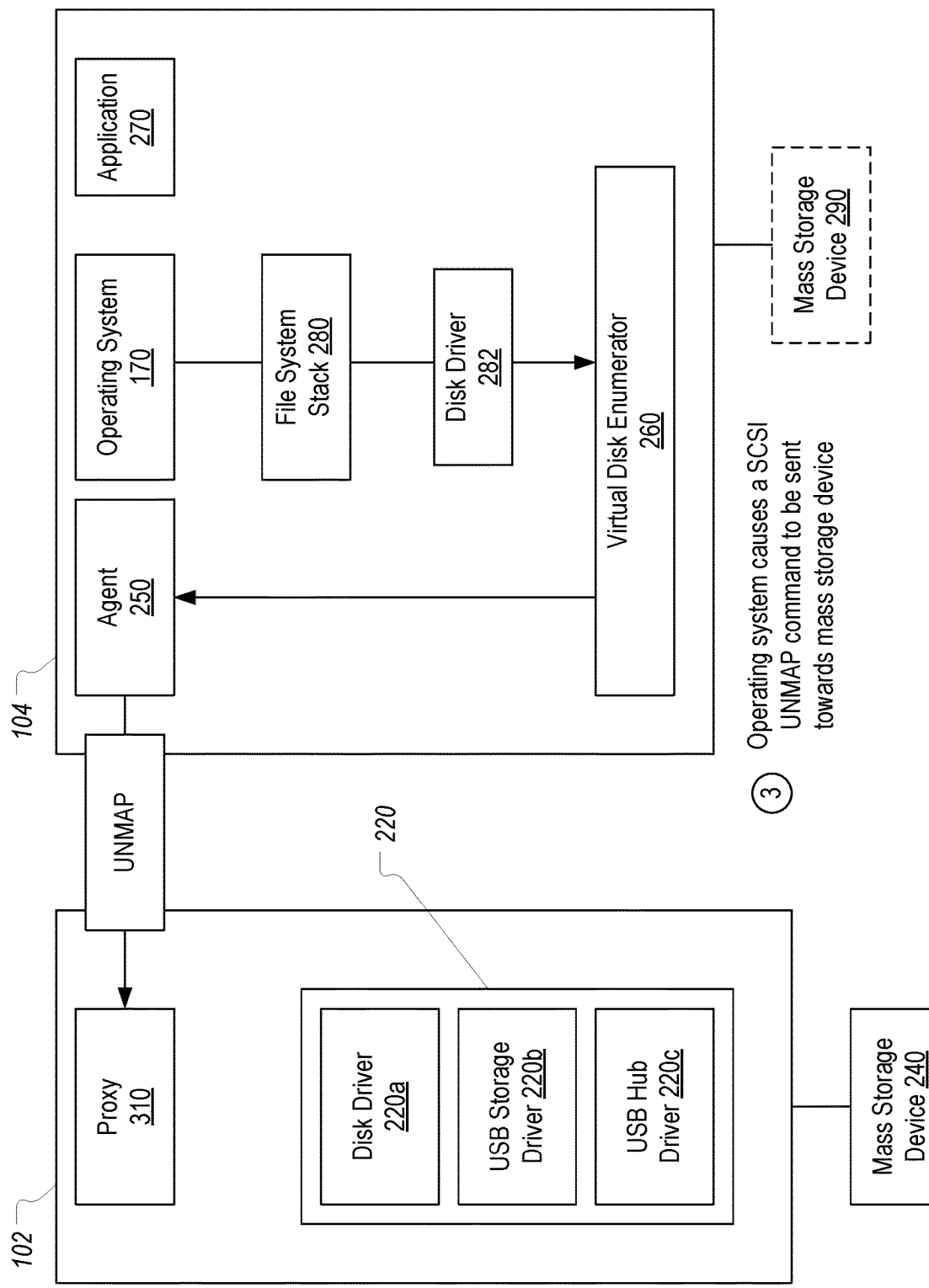
Figure 5D:
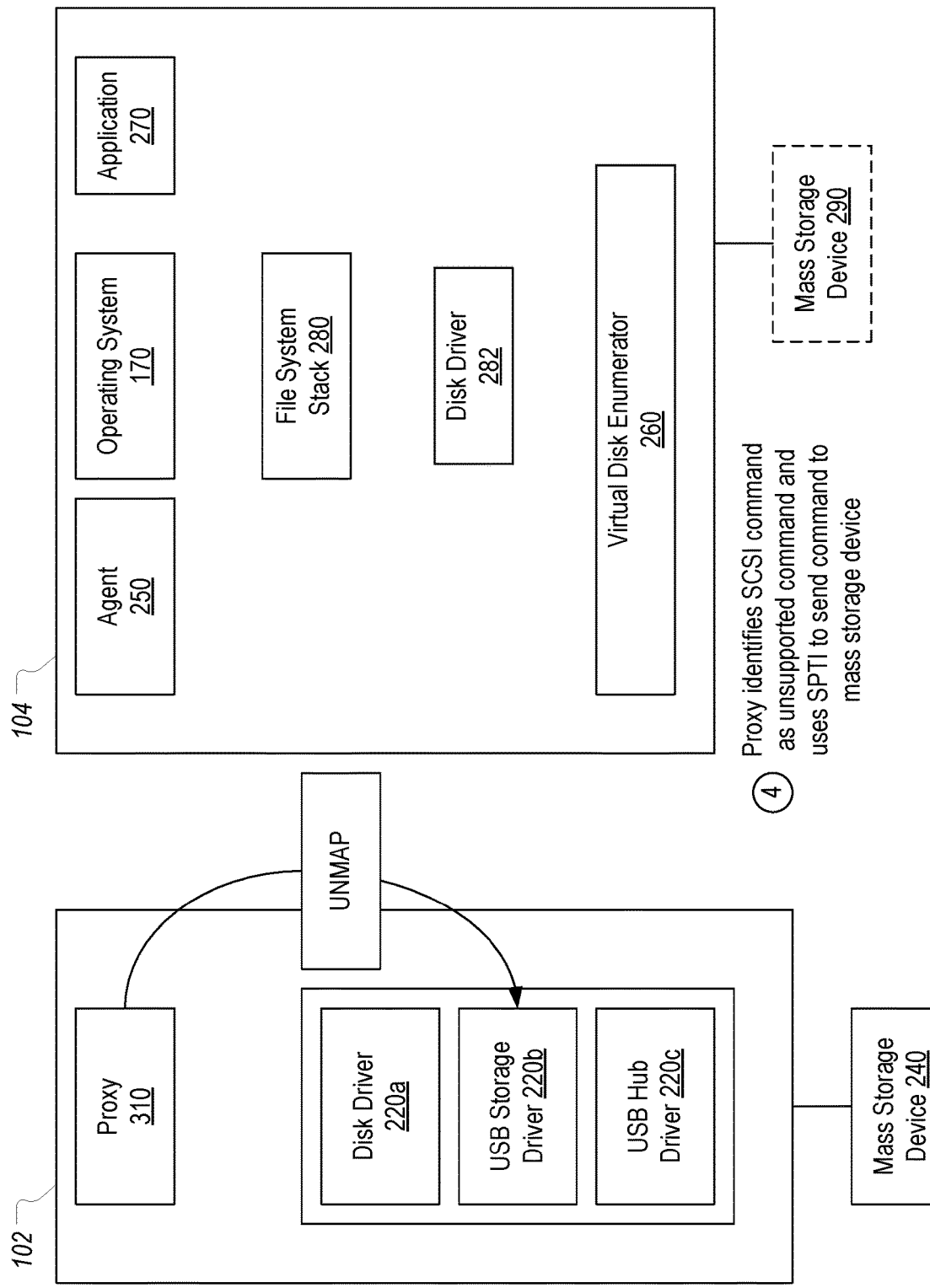

In contrast, FIG. 5C shows that, in step 3, proxy 310 receives an UNMAP command. This UNMAP command could have been generated by operating system 170 in conjunction with a file on mass storage device 240 being deleted. It is noted, however, that the manner in which SCSI commands are initiated is not essential to the invention.

Proxy 310 can again analyze the command to determine whether it is supported by disk driver 220a. In this case, proxy 310 will determine that the UNMAP command is not supported in SPC-3 and therefore disk driver 220a would reject it. Therefore, in step 4 shown in FIG. 5D, proxy 310 will employ a SCSI Pass Through Interface (SPTI) to pass the UNMAP command (i.e., an equivalent IRP and accompanying SRB) to mass storage device 240 thereby bypassing disk driver 220a. As an example, proxy 310 can accomplish this by creating an IRP of type IRP_MJ_DEVICE_CONTROL with an IOCTL code of IOCTL_SCSI_PASS_THROUGH_or_IOCTL_SCSI_PASS_THROUGH_DIRECT and with a CDB that defines the UNMAP command and its parameters in the accompanying SRB. By employing a SPTI, proxy 310 will prevent disk driver 220a from handling and rejecting the UNMAP command.

Figure 5E:
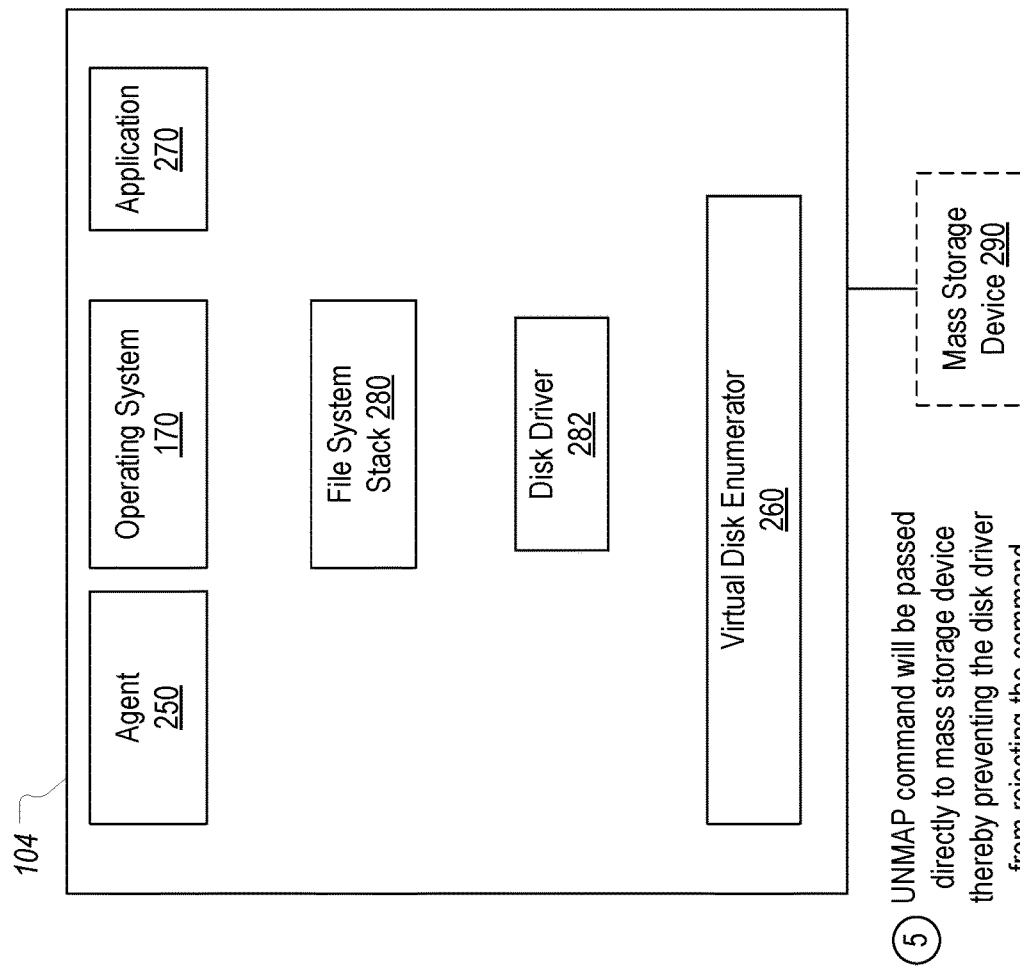
Figure 5E:
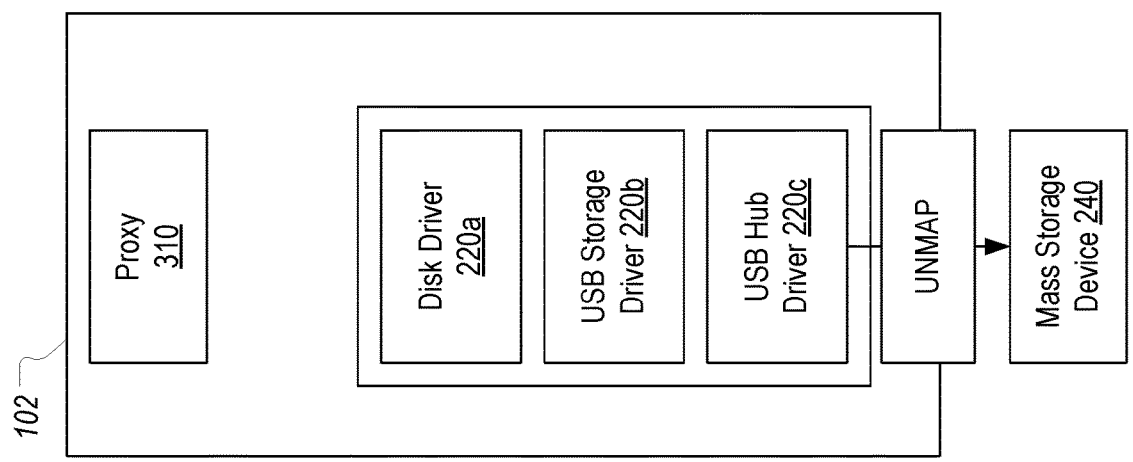

Finally, in step 5 shown in FIG. 5E, the UNMAP command will be passed on to mass storage device 240 by the underlying USB drivers. Because mass storage device 240 is compliant with SPC-4, it will properly handle the UNMAP command resulting in more efficient garbage collection, better performance, and lesser write amplification.

In summary, the present invention can cause a redirected mass storage device to be initialized on the server as compliant with the highest version of the SCSI protocol that the server supports irrespective of the version that the client terminal supports. The client-side proxy can then selectively route SCSI commands based on whether the client-side disk driver supports the SCSI command.

Figure 6:
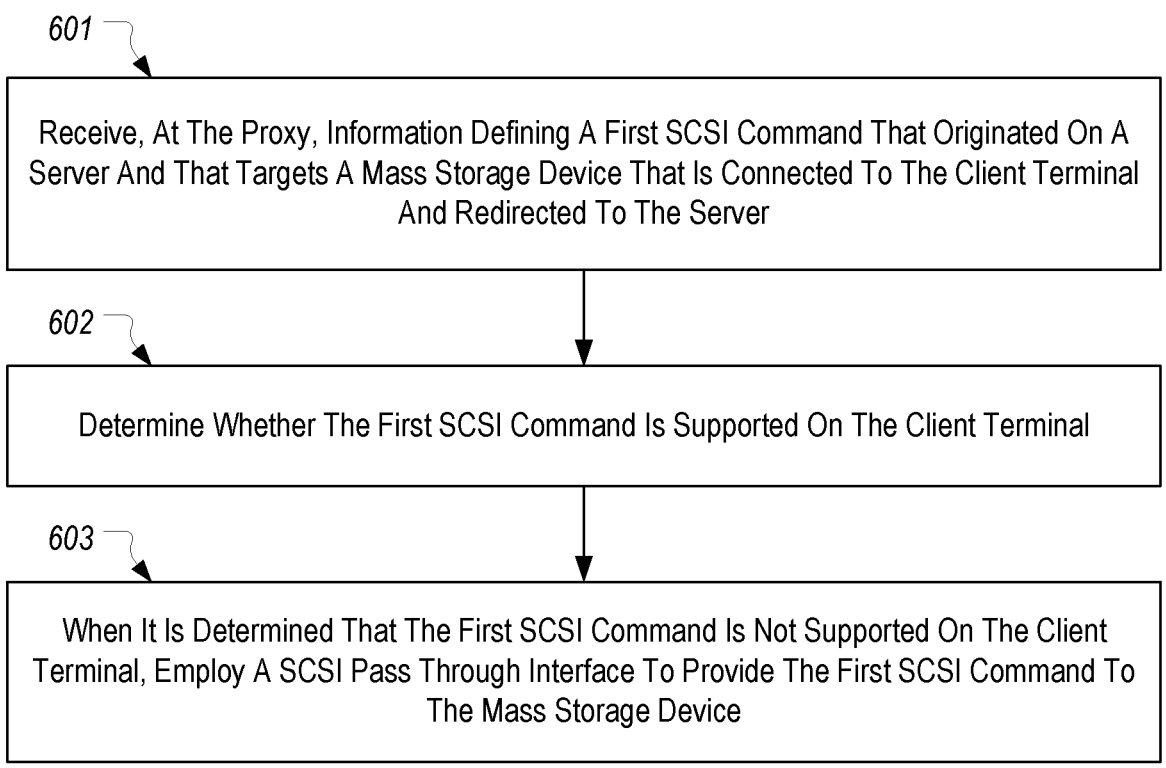
FIG. 6 provides a flowchart of an example method for enabling SCSI commands that are not supported by a client terminal.

FIG. 6 provides a flowchart of an example method 600 for enabling SCSI commands that are not supported by a client terminal. Method 600 can be implemented by a client-side proxy in a virtual desktop infrastructure such as proxy 310.

Method 600 includes an act 601 of receiving, at the proxy, information defining a first SCSI command that originated on a server and that targets a mass storage device that is connected to the client terminal and redirected to the server. For example, when an IRP targeting mass storage device 240 is generated on server 104, proxy 310 can receive sufficient information from agent 250, including the SCSI command contained in the IRP, to allow an equivalent IRP to be created on client terminal 102.

Method 600 includes an act 602 of determining whether the first SCSI command is supported on the client terminal. For example, proxy 310 can determine whether the first SCSI command is a command that is not supported by the operating system on client terminal 102.

Method 600 includes an act 603 of employing a SCSI Pass Through Interface to provide the first SCSI command to the mass storage device when it is determined that the first SCSI command is not supported on the client terminal. For example, if the SCSI command is UNMAP and client terminal 102 only supports SPC-3, proxy 310 can employ a SPTI to provide the UNMAP command directly to mass storage device 240 rather than providing the UNMAP command to disk driver 220a.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a proxy executing on a client terminal in a virtual desktop infrastructure environment, for enabling SCSI commands that are not supported by a client terminal, the method comprising:
    in response to a mass storage device being connected to the client terminal, sending, by the proxy that is executing on the client terminal, an INQUIRY command to the mass storage device to obtain a highest version of the SCSI protocol that the mass storage device supports;
    in response to obtaining the highest version of the SCSI protocol that the mass storage device supports, sending, by the proxy, information about the mass storage device to an agent executing on the server, the information including the highest version of the SCSI protocol that the mass storage device supports to thereby cause a corresponding virtual mass storage device to be initialized on the server as complying with the highest version of the SCSI protocol that the mass storage device supports to thereby cause the mass storage device to be redirected to the server;
    receiving, at the proxy, information defining a first SCSI command that originated on the server and that targets the mass storage device that is connected to the client terminal and redirected to the server;
    determining, by the proxy, whether the first SCSI command that originated on the server is supported by a disk driver in a disk driver stack that has been loaded on the client terminal for the mass storage device; and
    when it is determined that the first SCSI command is not supported by the disk driver, employing, by the proxy, a SCSI Pass Through Interface to provide the first SCSI command to a storage driver that has been loaded on the client terminal for the mass storage device without providing the first SCSI command to the disk driver, whereas, when it is determined that the first SCSI command is supported by the disk driver, providing, by the proxy, the first SCSI command to the disk driver;
    wherein employing the SCSI Pass Through Interface to provide the first SCSI command comprises creating, by the proxy, an I/O Request Packet that includes a SCSI Request Block that embeds a Command Descriptor Block containing the first SCSI command; and
    wherein the first SCSI command is either the TRIM command or the UNMAP command.

2. The method of claim 1, wherein determining whether the first SCSI command is supported by the disk driver comprises determining whether the first SCSI command is included in a version of the SCSI protocol with which an operating system on the client terminal complies.

3. The method of claim 1, wherein determining whether the first SCSI command is supported by the disk driver comprises comparing the first SCSI command to a list of SCSI commands that are known to be unsupported by the disk driver.

4. The method of claim 1, wherein the highest version of the SCSI protocol that the mass storage device supports is higher than a version of the SCSI protocol that an operating system of the client terminal supports.

5. The method of claim 1, wherein the information defining the first SCSI command is received via a remote display protocol connection between the proxy and an agent executing on the server.

6. One or more computer storage media storing computer executable instructions which when executed by one or more processors implement a virtual desktop infrastructure that includes:
    an agent that executes on a server;
    a virtual disk enumerator that executes on the server; and
    a proxy that executes on a client terminal to which a mass storage device is connected, the proxy being configured to:
        identify a highest version of the SCSI protocol that the mass storage device supports;
        provide the highest version of the SCSI protocol that the mass storage device supports to the agent;
        receive information defining SCSI commands that target the mass storage device, the SCSI commands originating on the server to which the mass storage device is redirected;
        determine whether each SCSI command that originated on the server is supported by a disk driver in a disk driver stack that has been loaded on the client terminal for the mass storage device; and selectively route each SCSI command to the mass storage device based on whether the SCSI command is supported by the disk driver, wherein when the SCSI command is not supported by the disk driver, the SCSI command is provided to a storage driver that has been loaded on the client terminal for the mass storage device via a SCSI Pass Through Interface without providing the SCSI command to the disk driver, whereas, when the SCSI command is supported by the disk driver, the SCSI command is provided to the disk driver, wherein the SCSI commands that are provided to the mass storage device via the SCSI Pass Through Interface include the TRIM command and the UNMAP command;

wherein the virtual disk enumerator is configured to:
receive information about the mass storage device including the highest version of the SCSI protocol that the mass storage device supports;
cause a virtual mass storage device representing the mass storage device to be initialized on the server as being compliant with the highest version of the SCSI protocol that the mass storage device supports, and extract the information defining the SCSI commands from I/O Request Packets on the server and provide the information to the proxy via the agent.

7. The computer storage media of claim 6, wherein determining whether each SCSI command is supported by the disk driver comprises determining whether the SCSI command is included in a version of the SCSI protocol with which an operating system on the client terminal complies.

8. One or more computer storage media storing computer executable instructions which when executed implement a proxy on a client terminal in a virtual desktop infrastructure environment, the proxy being configured to perform a method for enabling SCSI commands that are not supported by a client terminal, the method comprising:
in response to a mass storage device being connected to the client terminal, sending, by the proxy that is executing on the client terminal, an INQUIRY command to the mass storage device to obtain a highest version of the SCSI protocol that the mass storage device supports;
in response to obtaining the highest version of the SCSI protocol that the mass storage device supports, sending, by the proxy, information about the mass storage device to an agent executing on the server, the information including the highest version of the SCSI protocol that the mass storage device supports to thereby cause a corresponding virtual mass storage device to be initialized on the server as complying with the highest version of the SCSI protocol that the mass storage device supports to thereby cause the mass storage device to be redirected to the server;
receiving, at the proxy, information defining a first SCSI command that originated on the server and that targets the mass storage device that is connected to the client terminal and redirected to the server;
determining, by the proxy, whether the first SCSI command that originated on the server is supported by a disk driver in a disk driver stack that has been loaded on the client terminal for the mass storage device; and
when it is determined that the first SCSI command is not supported by the disk driver, employing, by the proxy, a SCSI Pass Through Interface to provide the first SCSI command to a storage driver that has been loaded on the client terminal for the mass storage device without providing the first SCSI command to the disk driver, whereas, when it is determined that the first SCSI command is supported by the disk driver, providing, by the proxy, the first SCSI command to the disk driver;
wherein employing the SCSI Pass Through Interface to provide the first SCSI command comprises creating, by the proxy, an I/O Request Packet that includes a SCSI Request Block that embeds a Command Descriptor Block containing the first SCSI command; and
wherein the first SCSI command is either the TRIM command or the UNMAP command.

9. The computer storage media of claim 8, wherein determining whether the first SCSI command is supported by the disk driver comprises determining whether the first SCSI command is included in a version of the SCSI protocol with which an operating system on the client terminal complies.

10. The computer storage media of claim 8, wherein determining whether the first SCSI command is supported by the disk driver comprises comparing the first SCSI command to a list of SCSI commands that are known to be unsupported by the disk driver.

11. The computer storage media of claim 8, wherein the highest version of the SCSI protocol that the mass storage device supports is higher than a version of the SCSI protocol that an operating system of the client terminal supports.

12. The computer storage media of claim 8, wherein the information defining the first SCSI command is received via a remote display protocol connection between the proxy and an agent executing on the server.

* * * * *